United States Patent [19]

Watanabe

[11] Patent Number: 5,095,443
[45] Date of Patent: Mar. 10, 1992

[54] PLURAL NEURAL NETWORK SYSTEM HAVING A SUCCESSIVE APPROXIMATION LEARNING METHOD

[75] Inventor: Sumio Watanabe, Yokohama, Japan
[73] Assignee: Ricoh Company, Ltd., Tokyo, Japan
[21] Appl. No.: 416,941
[22] Filed: Oct. 4, 1989

[30] Foreign Application Priority Data

Oct. 7, 1988 [JP] Japan .................. 63-254490
Nov. 29, 1988 [JP] Japan .................. 63-301353

[51] Int. Cl.$^5$ .................................. G06F 15/18
[52] U.S. Cl. ........................... 395/11; 395/23; 395/24
[58] Field of Search ............... 364/513; 382/15; 360/513

[56] References Cited

U.S. PATENT DOCUMENTS

| | | | |
|---|---|---|---|
| 4,760,604 | 7/1988 | Cooper et al. | 382/15 |
| 4,805,225 | 2/1989 | Clark | 382/15 |
| 4,858,147 | 8/1989 | Conwell | 364/513 |
| 4,912,655 | 3/1990 | Wood | 364/513 |

OTHER PUBLICATIONS

Kollias et al., "Adaptive Training of Multilayer Neural Networks Using a Least Squares Estimation Technique", *IEEE International Conference on Neural Networks, San Diego, CA, Jul. 24-27 1988*, pp. I-383 to I-390.

Lippmann, "An Introduction to Computing with Neural Nets", *IEEE ASSP Magazine*, Apr. 1987, pp. 4-22.

D. E. Rumelhart, "Learning Internal Representations by Error Propagation", Mit Press, pp. 318-362, 1986.

Y. Anzai, "Connectionist Models and Recognition Information Processing", pp. 1-27, Dec. 11, 1987.

*Primary Examiner*—Allen R. MacDonald
*Assistant Examiner*—Roger S. Joyner
*Attorney, Agent, or Firm*—Oblon, Spivak, McClelland, Maier & Neustadt

[57] ABSTRACT

A neural network structure includes input units for receiving input data, and a plurality of neural networks connected in parallel and connected to the input units. The plurality of neural networks learn in turn correspondence between the input data and teacher data so that the difference between the input data and the teacher becomes small. The neural network structure further includes output units connected to the plurality of neural networks, for outputting a result of learning on the basis of the results of learning in the plurality of neural networks.

9 Claims, 4 Drawing Sheets

PLURAL NEURAL NETWORK SYSTEM HAVING A SUCCESSIVE APPROXIMATION LEARNING METHOD

BACKGROUND OF THE INVENTION

The present invention generally relates to a neural network structure and a neural network learning method. The present invention is applicable to every device relating to information processing such as voice recognition, image processing, automatic translation, or associative storage.

An attempt to model a nervous system of a living thing and analyze its information processing mechanism was started by MuCulloch, Pitts et al. in 1943. The neutron model is a digital model which outputs an inpulse. After that, an analog model was studied in the light of the fact that in a sense system an intensity of stimulus and information are transmitted by frequency in appearance of inpulses and a relaxing potential (analog amount). A basic characteristic of analog neutron is expressed by spatial sum, non-linear type output function and threshold value, sometimes, by additionally using time integral. Rosenblart got a hint from a visual system and proposed a neural network of a layer structure having a state of 1/0, called "perceptron" in 1958. The layer structure is a scheme for expressing a basic structure of nervous system as studied in connection with a nervous system of the cerebellum (Marr, 1969). Particularly, it is being considered that the layer structure can express peripheral systems (a sense system, a motor system) well. After that, emphasis was put on an analysis of ability in view of mathematical engineering rather than relationship in view of physiology. Recently, learning ability of neural networks is being attracted, and various attempts to apply neural networks to recognition are being done.

Generally, a regular synthesis method is being employed as a method of generating voice. This method is such that voices uttered by persons are analyzed to find out rules of utterance, and voices are synthesized on the basis of the rules. The regular synthesis method has an advantage in that synthesized voices which form an arbitrary document (sentence) can be generated even by a small-scale system, and on the other hand, has a disadvantage in that complex rules are required to generate natural synthesized voices and further it becomes very difficult to extract general rules from the utterances. On the other hand, the use of neural networks enables it to be possible to simultaneously have a system learn acoustic parameters precisely representing features of voices actually uttered, and an environment within a sequence of input codes where the actual voices are placed. After learning, a sequence of codes is input in the system and voices are synthesized by the input codes.

Presently, a back propagation method is frequently used as a learning process for neural network. The back propagation method has an advantage that it makes it possible to learn weighting factors for neutron elements in a layer to which a target quantity is supplied, by using an amount of back propagation error (see Rumelhart, et al., "Parallel Distributed Processing", MIT Press, 1986).

Recently, it is becoming clear that the proposed back propagation method is very effective as a learning method for a multilayer perceptron. However, the back propagation method has the following disadvantages. First, it is possible to find out only a point which minimizes error. Once falling a local minimum, learning cannot advance. Second, the number of output layers increases with an increase in the number of links connecting adjacent layers and thus the network structure becomes complex. As a result, the ability of learning deteriorates.

An improvement of the back propagation method has been proposed, which is directed to compensating the aforementioned first disadvantage (see "COMPUTER TODAY", 1988/9, No. 27, pp. 54-59). However, there is room for improvement.

SUMMARY OF THE INVENTION

Accordingly, a general object of the present invention is to provide an improved neural network structure and an improved neural network learning method.

A more specific object of the present invention is to provide a neural network structure which learns the correspondence between an input pattern and teacher pattern (data) with high speed and high precision.

The above objects of the present invention can be achieved by a neural network structure comprising input unit means for receiving input data, a plurality of neural networks connected in parallel and connected to the input unit means, the plurality of neural networks learning in turn correspondence between the input data and teacher data so that the difference between the input data and the teacher becomes small, and output unit means, connected to the plurality of neural networks, for outputting a result of learning on the basis of the results of learning in the plurality of neural networks.

The aforementioned objects of the present invention can also be achieved by a neural network structure comprising input unit means for receiving input data, a plurality of neural networks connected in parallel and connected to the input unit means, the plurality of neural networks learning in turn correspondence between the input data and teacher data so that the difference between the input data and the teacher becomes small, and output unit means, connected to the plurality of neural networks, for outputting a result of learning on the basis of the results of learning in the plurality of neural networks. Each of the neural networks includes input units connected to the input units means, each of the input units passing the input data as it is, intermediate units connected to the input units through links, each of the input units modifying the sum of the input data supplied to the input units and outputting modified data, and output units connected to the output unit means, each of the intermediate units being connected to one of the output units through a link, each of the output units modifying the sum of the modifying data supplied thereto from the related intermediate units.

Another object of the present invention is to provide a neural network learning method applied to the aforementioned neural network structure.

This object of the present invention can be achieved by a neural network learning method comprising the steps of a) supplying a first neural network selected among from a plurality of neural networks connected in parallel with input data, b) letting the first neural network learn the correspondence between the input data and teacher data, c) determining whether the learning in the first neural network should be stopped on the basis of a predetermined condition, d) determining whether the result of learning in the first neural network is a satisfactory result, e) supplying a second neural network selected among from the plurality of neural networks when the result of learning is not the satisfactory result, f) letting the second neural network learn the correspondence so that the sum of the results of learning derived from the first and second neural networks becomes close to the teacher data, g) determining whether the learning in the second neural network should be stopped on the basis of the predetermined condition, h) determining whether the result of learning in the second neural network is the satisfactory result, and g) repeatedly carrying out the steps (e) through (h) with respect to third and following neural networks until the satisfactory result is obtained.

Additional objects, features and advantages of the present invention will become apparent from the following detailed description when read in conjunction with the accompanying drawings.

DESCRIPTION OF THE PREFERRED EMBODIMENTS

Figure 1:
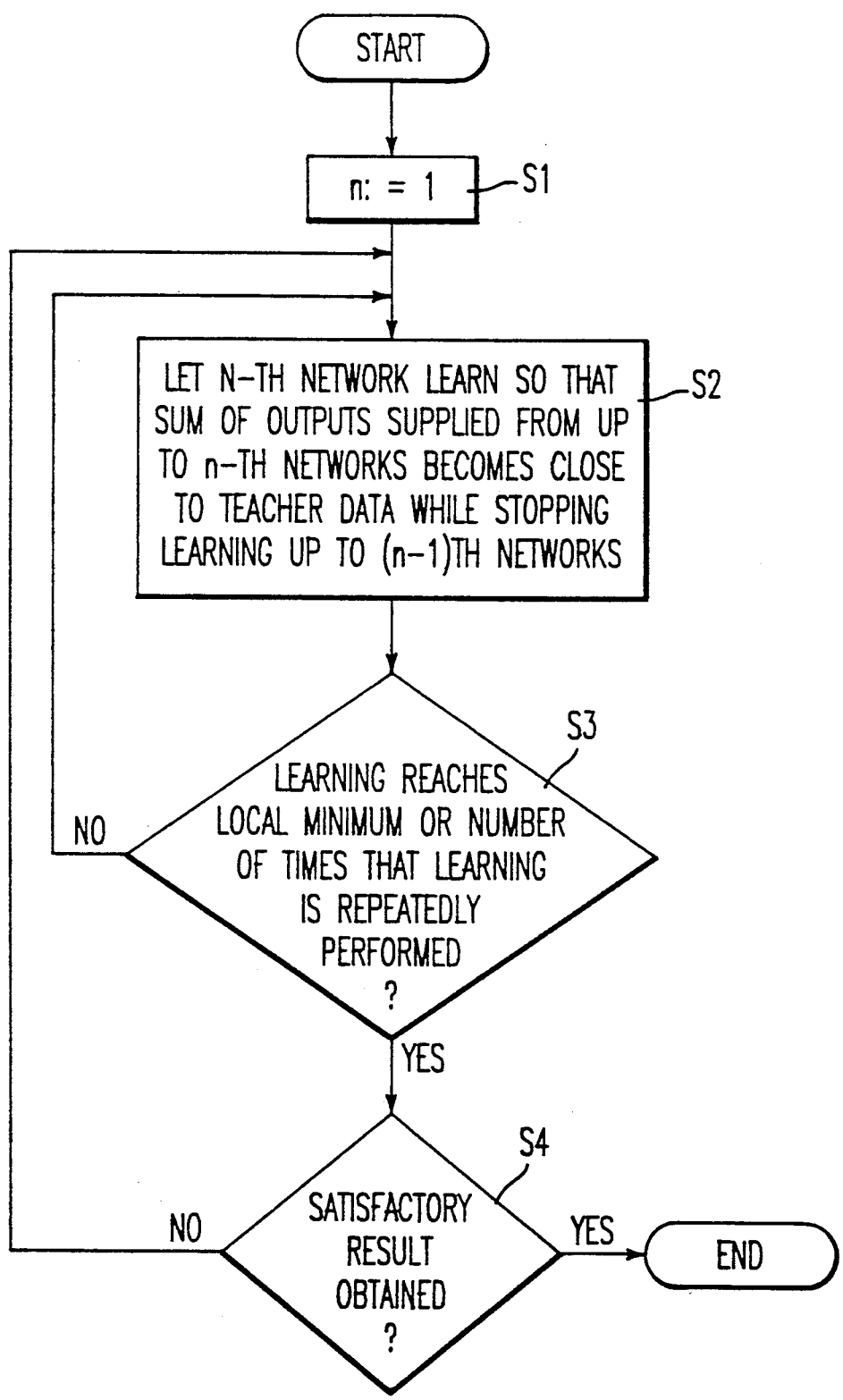
FIG. 1 is a flowchart of a procedure according to a first embodiment of the present invention.

A description is given of a first embodiment of the present invention with reference to FIG. 1.

The illustrated procedure relates to a case where n neural networks (n is an integer equal to or large than 1) connected in parallel learn in turn the correspondence between input patterns and teacher data. First, one of the neural networks (n=1) is selected (step S1). Next, step S2 has the selected neural network (n=1) learn the correspondence by the conventional back propagation process. The back propagation process is directed to reducing the difference between an output derived from the neural network and the teacher data. The procedure of step S2 is continued until a local minimum is obtained or for a predetermined number of times that the learning is repeatedly carried out (step S3). If a satisfactory output is obtained by the selected one of the neural networks, the neural network of concern stops learning (step S4). On the other hand, if a satisfactory output is not obtained in step S4, n is incremented by +1 and step 2 is subjected to the next (second) neural network (n=2). Then, step S2 has the second (n=2) neural network learn the difference between the teacher data and the sum of the output derived from the first neural network (n=1) and the output derived from the second neural network (n=2) so that the sum becomes close to the teacher data. Then steps S3 and S4 are carried out in the same manner as those for the first neural network. At step S2, the n-th neural network learns the correspondence between the sum of the outputs derived from the up to n-th neural networks and the teacher data so that the sum becomes close to the teacher data, while the learning of the up to (n−1)th neural networks other than the n-th neural network is stopped. As the learning advances, the difference between the sum of the outputs derived from neural networks and the teacher data decreases. When a satisfactory output is obtained, the learning is stopped. In the above-mentioned manner, a parallel network leans. The output thus obtained through the parallel network is more precise than that through a sole neural network.

Figure 2:
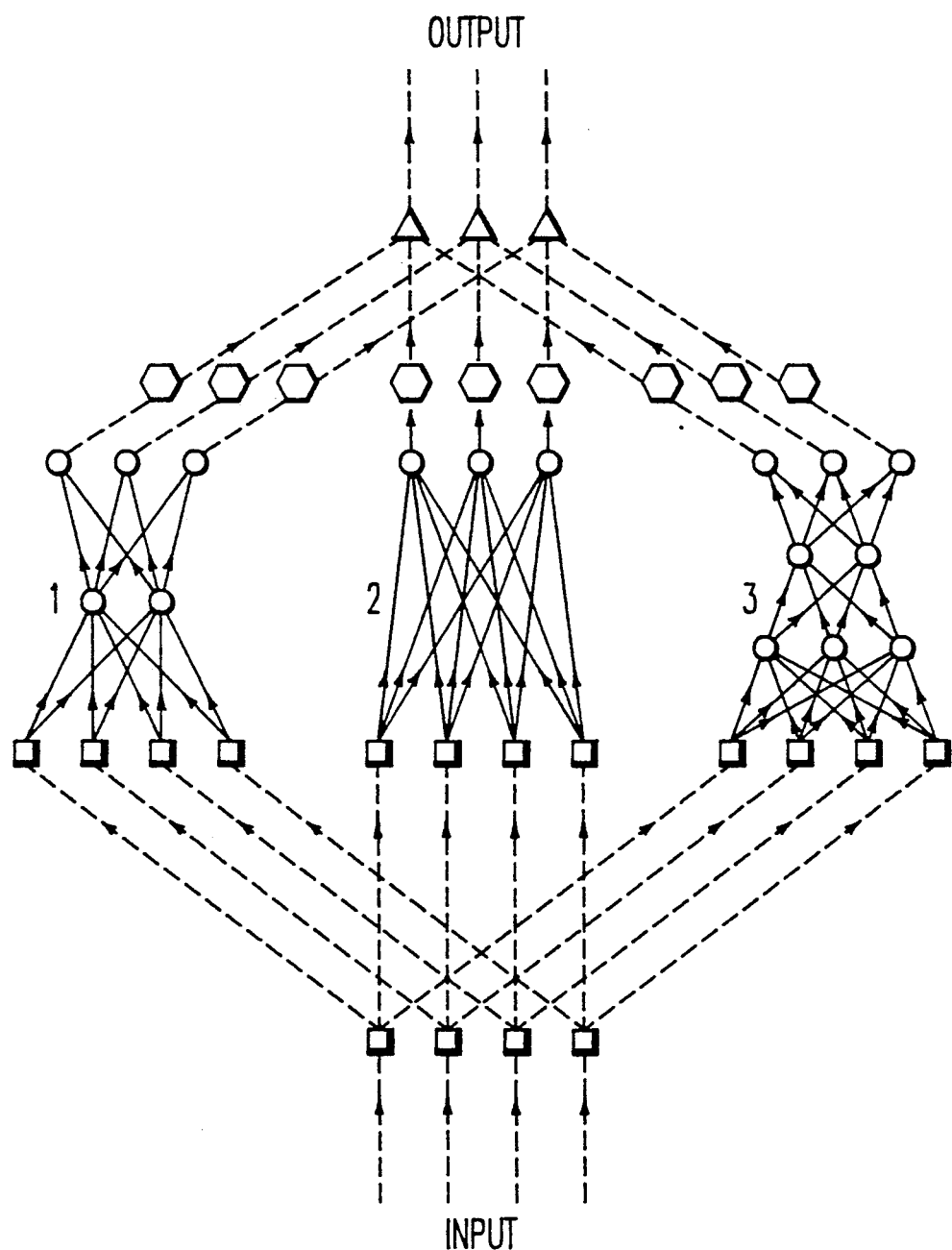
FIG. 2 is a diagram of a parallel network structure according to the first embodiment of the present invention.

An embodiment of the parallel network structure including a plurality of neural networks arranged in parallel according to the present invention is illustrated in FIG. 2. Referring to FIG. 2, the parallel network structure includes neural networks 1, 2 and 3 connected in parallel. A solid line in FIG. 2 denotes a link which connects a unit and a different unit in the same neural network. An arrow indicates a direction in which information is transferred. Information is transferred under the following two rules. First, when information is transferred on a broken line (connecting line) shown in FIG. 2, no change is given to the transferred information. Second, when information is transferred on each of the aforementioned solid lines, the information which enters a link of solid line, or an input value is multiplied by a weighting factor given to the solid line (link) of concern.

Figures of triangle, rectangle, hexagon and circle denote units each having the following respective relation between input and output. A unit denoted by a triangle generates an output value equal to the sum of values of inputs applied thereto. A unit denoted by a rectangle (especially called terminal) generates an output value equal to an input value. A unit of a hexagon generates an output value represented by (ax+b) where x is the value of an input applied thereto, a is a magnification of the unit, and b is a bias of the unit. A unit denoted by a circle generates an output value represented as f(net) by using the sum of the input values applied thereto, a bias $\theta$ of the present unit and a monotone increasing function. For example, $f(x)=1/(1+\exp(x))$. Using the above-mentioned parallel network structure, the learning is carried out as follows.

(A) Learning process for the neural network 1 (n=1):

When using $f(x)=1/(1+\exp(x))$, the range of output values derived from each neural network corresponds to section (0, 1) (between 0 and 1). The values of the magnification a and the bias b of each unit of hexagon are selected before starting learning so that the output value corresponds to teacher data. For example, when the range of values of the output data corresponds to a section (A, B), the values of the magnification a and the bias b are selected by the following formulas:

$$a = B - A$$

$$b = A.$$

Next, the outputs derived by the neural networks other than the neural network 1 are set to 0, and the learning by the neural network 1 based on the conventional back propagation method is carried out. That is, when the weighting factor of a link from unit i to unit j is $w_{ji}$, and the bias of unit j is $\theta_j$, the weighting factor $w_{ji}$ and the bias $\theta_j$ are changed so that square of an error between the given teacher data and the output value is minimized. It is noted that in the conventional back propagation method the smallest (optimum) value in the square error is sought by use of a maximum diving method (sigmoid function). Therefore, in actuality, further learning is not possible when the square error as a function of magnification of the weighting factor reaches a local minimum. It is possible to determine whether the learning reaches a local minimum by the following procedure. That is, when the square error of the teacher data and the output value is unchanged for a sufficiently large number of times that the learning is repeatedly carried out, the learning falls in a local minimum. When the learning reaches the local minimum, or when the number of times that the learning is repeatedly carried out becomes equal to a predetermined number, the learning in the neural network 1 is stopped.

(B) Learning procedure for the neural network 2 (n=2)

After the learning in the neural network 1 is ended, the learning in the neural network 2 is carried out. In this case, the results of the aforementioned learning in the neural network 1 are used. Therefore, teacher data for use in learning in the neural network 2 is data obtained by subtracting the teacher data for the entire neural networks from the output derived from the neural network 1. Before starting the learning in the neural network 2, the values of the magnification a and the bias b of each unit of hexagon are predetermined in the same manner as those values for the neural network 1 so that the output value derived from the neural network 2 corresponds to teacher data. The learning procedure an local minimum deciding procedure for the neural network 2 are the same as those for the neural network 1.

In the aforementioned manner, the learning in the neural networks 3, 4, 5, ... are carried out in turn. When the learning in the (n+1)-th neural network is being executed, the up to n-th neural networks are providing outputs obtained from the results of learning up to now.

It is obvious by those skilled in the art to configure the parallel network structure by software or hardware on the based on the description given in the foregoing.

The number of layers of neural networks may be different for different neural networks.

A variation of the first embodiment is described below. The second embodiment is the same as the first embodiment except that the number of layers of the neural network 1 in the variation is set equal to 1. That is, the number of layers of units each illustrated as a circle is set equal to 1. In this case, the neural network 1 is a single layer network. It is known than a single layer network can learn a linear separable pattern. In the variation, the first neural network is made to learn the linear relationship between the input and output values. Then the second and following neural networks over two layers or more are made to learn the non-linear relationship. In this case, the entire output is greatly influenced by the output of the neural network 1. Thus, a neural network attaching importance to the linear relationship between the input and outputs can be configured. For linear functions, the principle of superposition is effected. For this reason, it is possible to construct a neural network which can deduce an output with respect to unknown data.

Figure 3:
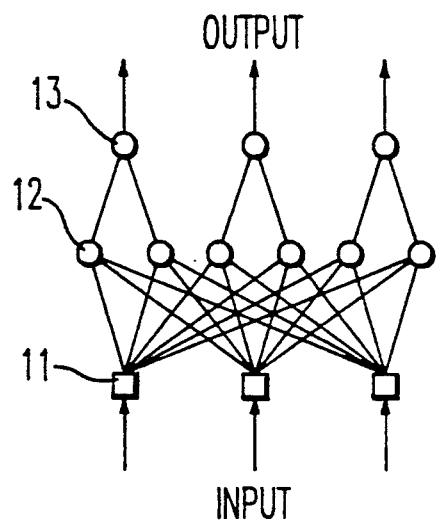
FIG. 3 is a diagram of a neural network structure according to a second embodiment of the present invention.
Figure 4:
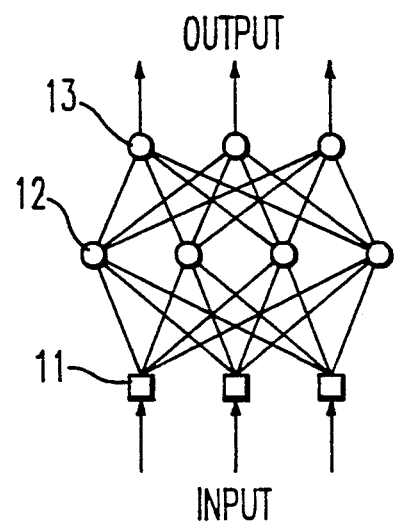
FIG. 4 is a diagram of a conventional neural network structure.

A description is given of a second preferred embodiment of the present invention. FIG. 3 illustrates a multilayer type perceptron according to the second embodiment of the present invention, and FIG. 4 illustrates a conventional multilayer type perceptron. Each of the perceptrons shown in FIGS. 3 and 4 includes an input layer 11, an intermediate layer 12 and an output layer 13. The perceptron according to the second embodiment of the present invention shown in FIG. 3 is distinguishable from the conventional perceptron shown in FIG. 4 in the following.

First, the conventional perceptron shown in FIG. 4 has a disadvantage that the learning ability thereof is considerably deteriorated due to complexity of its structure as the number of units in the output layer 13 increases. On the other hand, in the neural network of the perceptron shown in FIG. 3, each of the units in the output layer 13 (output unit) is independent of each other because each of the units in the intermediate layer 12 (intermediate unit) is connected to predetermined one of the units in the output layer 13. With this structure, it becomes possible to construct a network including a large number of units in the output unit 13 without deteriorating the learning ability.

Second, a specific recurrence formula which can achieve effective and efficient learning is suitably applied to the network structure shown in FIG. 3. The application of the specific recurrence formula to a conventional network structure having a large number of units in the output layer as shown in FIG. 4 cannot present advantageous results. For example, the values of the weighting factor and bias related to each link are liable to be divergent. Additionally, the efficiency in learning becomes extremely poor.

The second embodiment is further described with reference to FIGS. 5 and 6. When the d dimensional input pattern $\{In\}_{n=1, 2, \ldots, N}(In=(In_1, In_2, \ldots, In_d))$ and the corresponding e dimensional desirable output pattern $\}Tn\}_{n=1, 2, \ldots, N}(Tn=(Tn_1, Tn_2, \ldots, Tn_e))$ are given, a neural network which achieves correspondence therebetween is configured as follows.

Figure 5:
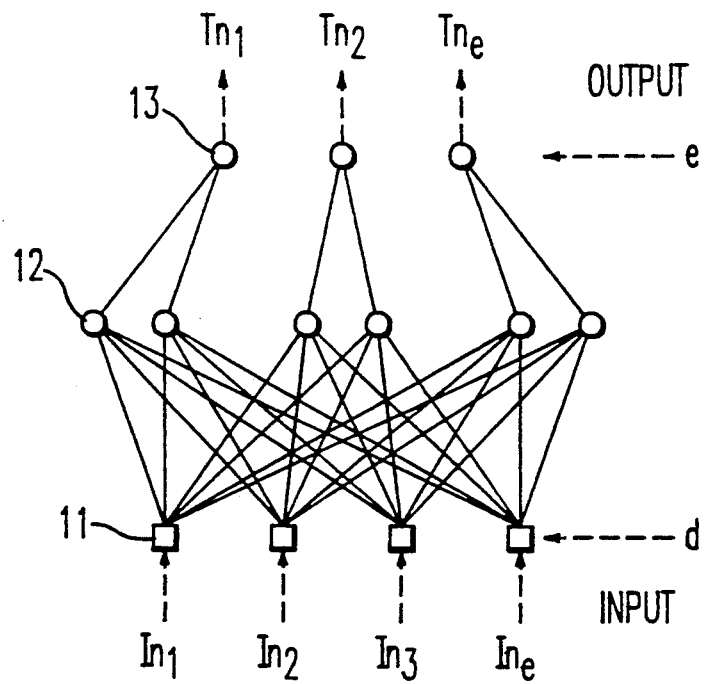
FIG. 5 is a diagram of a detailed neural network structure according to the second embodiment of the present invention.

Referring to FIG. 5, illustrated figures are given the same definitions as those shown in FIG. 2. It is assumed that the number of units in the input layer 11 is d which is equal to the dimension of the input pattern. The input pattern In is supplied to the terminals (units of rectangle) through the connecting lines. Each of the terminals sends each of the related links the same value as the corresponding value of the input pattern. Each of the links multiplies the value sent from the related terminal by the corresponding weighting factor W. Each of the units generates the following output:

$$f(net+\theta)$$

where the sum of the input values transferred to the present unit is 'net'. As described previously, $\theta$ is the bias value of each of the units, and the function f is given by the following formula:

$$f(x)=1/(1+\exp(-x)).$$

It is noted that each of the units in the intermediate layer 12 is connected to specific one of the units in the output layer 13. That is, there is no unit in the intermediate layer 12 which is connected to two units or more in the output layer 13.

By providing the network shown in FIG. 5 with the input pattern and the corresponding teacher data, the values of the weighting factor and bias of each of the units can be changed and learned in accordance with the following algorithm (recurrence formula).

$$\Delta W_{ji}(n+1)=\eta\delta_j O_i+\alpha\Delta W_{ji}(n)$$

$$\Delta\theta_j(n+1)=\eta\delta_j\alpha\Delta\theta_j(n)$$

where:
n; the number of times that the learning is carried out,
$\eta,\alpha$; are constants,
$0_i$; output of unit i, $$\delta_j = \begin{cases} (t_j - 0_j) \times [0_j(1 - 0_j) + F(t_j - 0_j)] \\ \text{(when } j \text{ relates to the output layer 13)} \\ \sum_k (W_k \delta_k) \times [0_j(1 - 0_j) + F(t_j - 0_j)] \\ \text{(when } j \text{ relates to the intermediate layer 12)} \end{cases}$$

F(x); a function which assumes values equal to or larger than 0, such as $F(x)=0.01 \times x^2$.

It is noted that the number of times that the learning is repeatedly carried out until the learning ends, is different for different units in the output layer 13. Thus, it is effective to perform the learning in networks independent for different units in the output layer 13. That is, one of the units in the output layer 13 is selected and made learn the correspondence. Next, different one of the units is selected and made learn the correspondence. In this manner, the units in the output layer 13 are selected one by one. It is noted that a procedure which makes all the units in the output layer 13 learn the correspondence at the same time is not effective and efficient.

Figure 6:
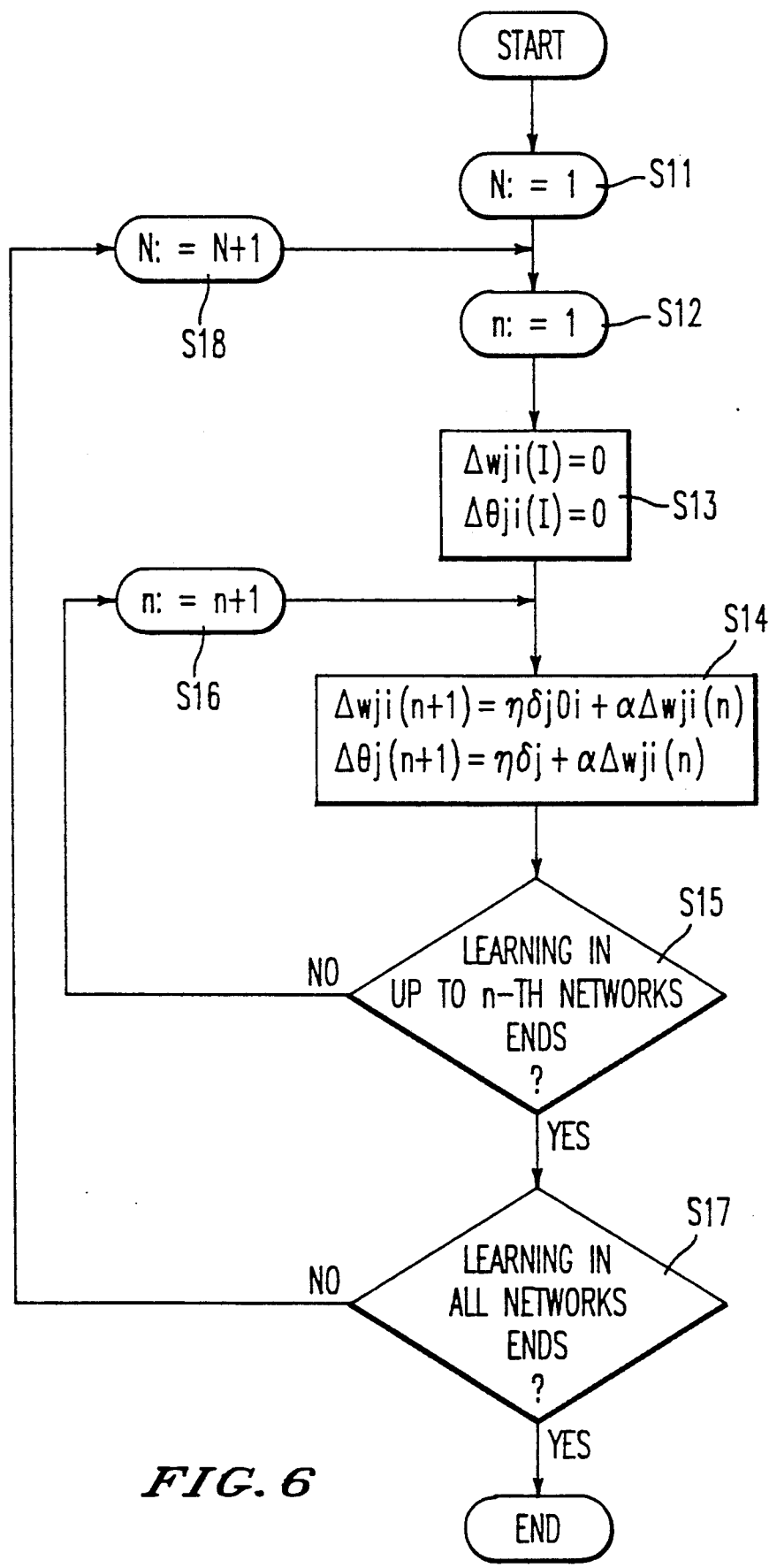
FIG. 6 is a flowchart of a procedure according to the second embodiment of the present invention.

Referring to FIG. 6, N is set to 1 (step S11), and n is set to 1 (step S12). Next, $\Delta W_{ji}(1)$ is set to 0, and $\Delta 0_{ji}(1)$ is set to 0 (step S13). Then, the following calculation is executed (step S14):

$$\Delta W_{ji}(n+1)=\eta\delta_j 0_i+\alpha\Delta W_{ji}(n)$$

$$\Delta\theta_j(n+1)=\eta\delta_j+\alpha\Delta W_{ji}(n).$$

Thereafter, it is determined whether the learning in the n-th network is ended (step S15). If the result in step S15 is NO, n is incremented by +1 (step S16), and the procedure in step S14 is carried out. On the other hand, when the result in step S15 is YES, it is determined whether the learning in all the networks is ended (step S17). When the result in step S17 is NO, N is incremented by +1 (step S18), and the procedure in step S12 is carried out. On the other hand, the result in step S17 is YES, the procedure ends.

The present invention is not limited to the aforementioned embodiments, and variations and modifications may be made without departing from the scope of the present invention.

What is claimed is:

1. A neural network structure comprising:
input unit means for receiving input data;
a plurality of neural networks connected in parallel and connected to said input unit means, said plurality of neural networks successively learning correspondence between said input data and teacher data, so that a difference between a first output of said neural network structure derived from said input data and a second output of said neural network structure derived from said teacher data is minimized; and
output unit means, connected to each of said plurality of neural networks, for outputting a result of learning on the basis of results of learning in said plurality of neural networks, a sum of said results of learning being a result of learning of said neural network structure.

2. A neural network structure as claimed in claim 1, wherein each of said output unit means include means for summing data supplied thereto, and the n-th neural network (n=1, 2, ...) learns said correspondence until a sum of the results of learning supplied form the up to n-th neural networks becomes equal to a predetermined result, while the learning of the up to(n−1)th neural networks is stopped.

3. A neural network structure as claimed in claim 2, wherein when said sum of the results of learning supplied from the up to n-th neural networks becomes sufficiently close to said teacher data, the learning is stopped and is not carried out in the (n+1)-th and following neural networks.

4. A neural network structure as claimed in claim 2, further comprising means for calculating an error, wherein the n-th neural network learns said correspondence until a local minimum is obtained in a square of an error calculated between an output of said nth neural network and an output based upon teacher data used to train said nth neural network.

5. A neural network structure as claimed in claim 2, further comprising means for counting, wherein the n-th neural network learns said correspondence until the number of times that the learning in the n-th neural network is repeatedly carried out becomes equal to a predetermined number.

6. A neural network structure as claimed in claim 1, wherein each of said plurality of neural networks includes a plurality of units each summing data supplied thereto and modifying said sum, and a plurality of links connected to said units, each of said links having a predetermined weighting factor.

7. A neural network structure as claimed in claim 6, wherein said plurality of units are of a multilayer structure and units for different layers are mutually connected through said links.

8. A neural network structure comprising:
input unit means for receiving input data;
a plurality of neural networks connected in parallel and connected to said input unit means, said plurality of neural networks successively learning correspondence between said input data and teacher data, so that the difference between an output derived from said input data and an output derived from said teacher data is minimized; and
output unit means, connected to each of said plurality of neural networks, for outputting results of learning of said plurality of neural networks;
wherein each of said neural networks includes:
input units connected to said input unit means, each of said input units passing said input data as it is;
intermediate units connected to said input units through links, each of said intermediate units summing said input data supplied thereto, modifying said sum and outputting modified data; and
output units connected to said output unit means, each of said intermediate units being connected to one of said output units through a link, each of said output units modifying said modified data supplied thereto from a related of said intermediate units.

9. A neural network structure as claimed in claim 8, wherein each of said neural networks learns said correspondence on the basis of a back propagation process so that the following formulas as satisfied $$\Delta W_{ji}(n+1) = \eta \delta_j O_i + \alpha \Delta W_{ji}(n)$$

$$\Delta \theta_j(n+1) = \eta \delta_j + \alpha \Delta \theta_j(n)$$

where:
  $W_{ji}$ is the weighting factor of the link connecting the unit i and the unit j,
  $\theta_j$ is a bias of the unit j,
  n; the number of times that the learning is carried out,
  $\eta \alpha$; are constants,
  $O_i$; output derived from unit i (i=1, 2, . . .)

$$\delta_j = \begin{cases} (t_j - O_j) \times [O_j(1 - O_j) + F(t_j - O_j)] \\ \text{(when } j \text{ indicates one of the output units)} \\ \sum_k (W_{kj}\,\delta_k) \times [O_j(1 - O_j) + F(t_j - O_j)] \\ \text{(when } j \text{ indicates one of the intermediate units)} \end{cases}$$

F(x); a function which assumes values equal to or larger than 0.

* * * * *